United States Patent [19]

Ullah et al.

[11] Patent Number: 5,260,729
[45] Date of Patent: Nov. 9, 1993

[54] NON-INTERFERING COLOR VIEWING SYSTEM USING SPECTRAL MULTIPLEXING

[75] Inventors: Motiur R. Ullah, Monterey Park; Philip M. Sagan, Redondo Beach; David A. Ansley, Long Beach, all of Calif.

[73] Assignee: Hughes Aircraft Company, Los Angeles, Calif.

[21] Appl. No.: 763,846

[22] Filed: Sep. 23, 1991

[51] Int. Cl.$^5$ .............................................. G09B 9/08
[52] U.S. Cl. ...................................... 353/84; 353/31; 434/44; 358/104
[58] Field of Search ............... 353/84, 31, 30, 122; 434/44, 40; 358/104; 359/133, 132, 124, 115

[56] References Cited

U.S. PATENT DOCUMENTS

| | | | |
|---|---|---|---|
| 3,557,470 | 1/1971 | Emerick | 434/44 |
| 4,134,644 | 1/1979 | Marks et al. | 359/466 |
| 4,347,507 | 8/1982 | Spooner | 434/44 |
| 4,620,770 | 11/1986 | Wexler | |
| 4,657,512 | 4/1987 | Mecklenborg | 434/44 |
| 5,004,331 | 4/1991 | Haseltine et al. | |

FOREIGN PATENT DOCUMENTS 0389123 9/1990 European Pat. Off.
906042 9/1962 United Kingdom.

Primary Examiner—William A. Cuchlinski, Jr.
Assistant Examiner—William C. Dowling
Attorney, Agent, or Firm—Elizabeth E. Leitereg; Terje Gudmestad; W. K. Denson-Low

[57] ABSTRACT

A viewing system operative to provide non-interfering color displays to two or more viewers disposed within a catadioptric projection display system. The non-interfering viewing system includes a projector subsystem 10 for generating a first image with radiant energy from a first set of color wavelengths and for generating a second image with radiant energy from a second set of color wavelengths. The first and second sets of wavelengths are spectrally multiplexed so as to include first and second red, blue and green wavelengths, respectively. A visor 32 is worn by a first viewer and includes a first triple notch filter. The first triple notch filter is adapted to transmit radiant energy of wavelengths included within the first set to the first viewer and to reject incident radiant energy of wavelengths included within the second set. A second visor 32 is worn by a second viewer and includes a second triple notch filter. The second triple notch filter is adapted to transmit radiant energy of wavelengths within the second set to the second viewer and to reject incident radiant energy of wavelengths within the first set.

17 Claims, 3 Drawing Sheets

NON-INTERFERING COLOR VIEWING SYSTEM USING SPECTRAL MULTIPLEXING

BACKGROUND OF THE INVENTION

1. Field of the Invention

This invention relates to catadioptric projection systems. More specifically, this invention relates to non-interfering viewing arrangements which enable two or more viewers to simultaneously view displays in such projection systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In conventional catadioptric aircraft simulators, a visual display is typically projected onto a reflecting screen on the inner surface of a dome. Certain simulators are designed to accommodate two or more viewers in order to allow, for example, fellow aircraft crew members to interact during simulator training. Unfortunately, projection systems used in simulator domes are generally operative to minimize the distortion of the projected image relative to a single preferred viewing position. Thus, essentially two possibilities exist with respect to positioning crew members within the simulator. First, one crew member may be placed in the preferred viewing position (i.e. at the focal point of the image). In this approach the display may appear relatively distorted to the viewer displaced from the preferred position. Second, the crew members may be symmetrically positioned with respect to the preferred viewing position. This configuration results in each crew member experiencing approximately equal degrees of display distortion.

A relatively expensive alternative to placing a pair of crew members within a single simulator dome is to position the crew members in separate simulators linked by a communication path. In this approach each crew member will usually be provided with a separate simulated cockpit, motion platform and visual display. However, this is an obviously somewhat more expensive approach.

The high cost of constructing separate simulators has led to the development of techniques for reducing the image distortion arising from the inclusion of more than one crew member under a particular simulator dome. In one such technique, often characterized as time multiplexing, the simulator projector rapidly alternates between projecting first and second displays within the simulator dome. The first display is intended to minimize the distortion associated with a viewing position occupied by a first crew member and the second display is generated so as to minimize the distortion experienced in viewing from the location of the second crew member. In this manner, each display is projected for approximately one-half of the length of the simulation. Each crew member wears a helmet having shutters (e.g. realized by liquid crystals) which appropriately open and close in synchronism with the alternating display.

Unfortunately, since each crew member is exposed to alternating light and dark image frames the effective bandwidth of the display is doubled—thereby degrading image contrast. Moreover, when time multiplexing is used in a simulator incorporating a single cathode ray tube (CRT) the switching time thereof may not be sufficiently rapid to ensure that crew members are isolated from viewing image frames intended to be seen by other crew members. That is, the phosphor screens of CRT's may "glow" from between a few microseconds to a few milliseconds subsequent to interruption of the electron beam impinging thereon.

A second technique for reducing image distortion within catadioptric simulators adapted to be used by more than a single occupant is often referred to as polarization multiplexing. In particular, a display intended for a first viewer is projected in a first polarization state while a display intended for a second viewer is projected in a second polarization state. Each viewer is equipped with a viewing helmet or the like operative to transmit light energy of one of the polarization states and to reject light polarized in the other. In this manner, each viewer only sees the display which has been projected in a manner designed to minimize the image distortion at the location of the viewer. However, the efficacy of this technique is impaired by the depolarization of the light energy included within each image upon reflection thereof by the simulator screen. This depolarization makes the "wrong" display partially visible to each viewer.

Accordingly, a need remains in the art for a viewing system disposed to simultaneously provide independent, non-interfering displays for two or more viewers.

SUMMARY OF THE INVENTION

The need in the art for a viewing system operative to provide non-interfering color displays to two or more viewers is addressed by the present invention. The inventive non-interfering viewing system includes a projector subsystem for generating a first image with radiant energy from a first set of color wavelengths and for generating a second image with radiant energy from a second set of color wavelengths. In a preferred embodiment of the present invention, the first and second sets of wavelengths are spectrally multiplexed to include first and second red, blue and green wavelengths, respectively.

The viewing system of the present invention further includes a first filter positioned in the field-of-view of a first viewer. The first filter is adapted to transmit radiant energy of wavelengths included within the first set to the first viewer and to reject incident radiant energy of wavelengths included within the second set.

The non-interfering viewing system further includes a second filter positioned in the field-of-view of a second viewer. The second filter is adapted to transmit radiant energy of wavelengths within the second set to the second viewer and to reject incident radiant energy of wavelengths within the first set.

As made more apparent by the following disclosure, the viewing system of the present invention thereby provides simultaneously independent, non-interfering displays for two or more viewers.

DETAILED DESCRIPTION OF THE INVENTION

Figure 1:
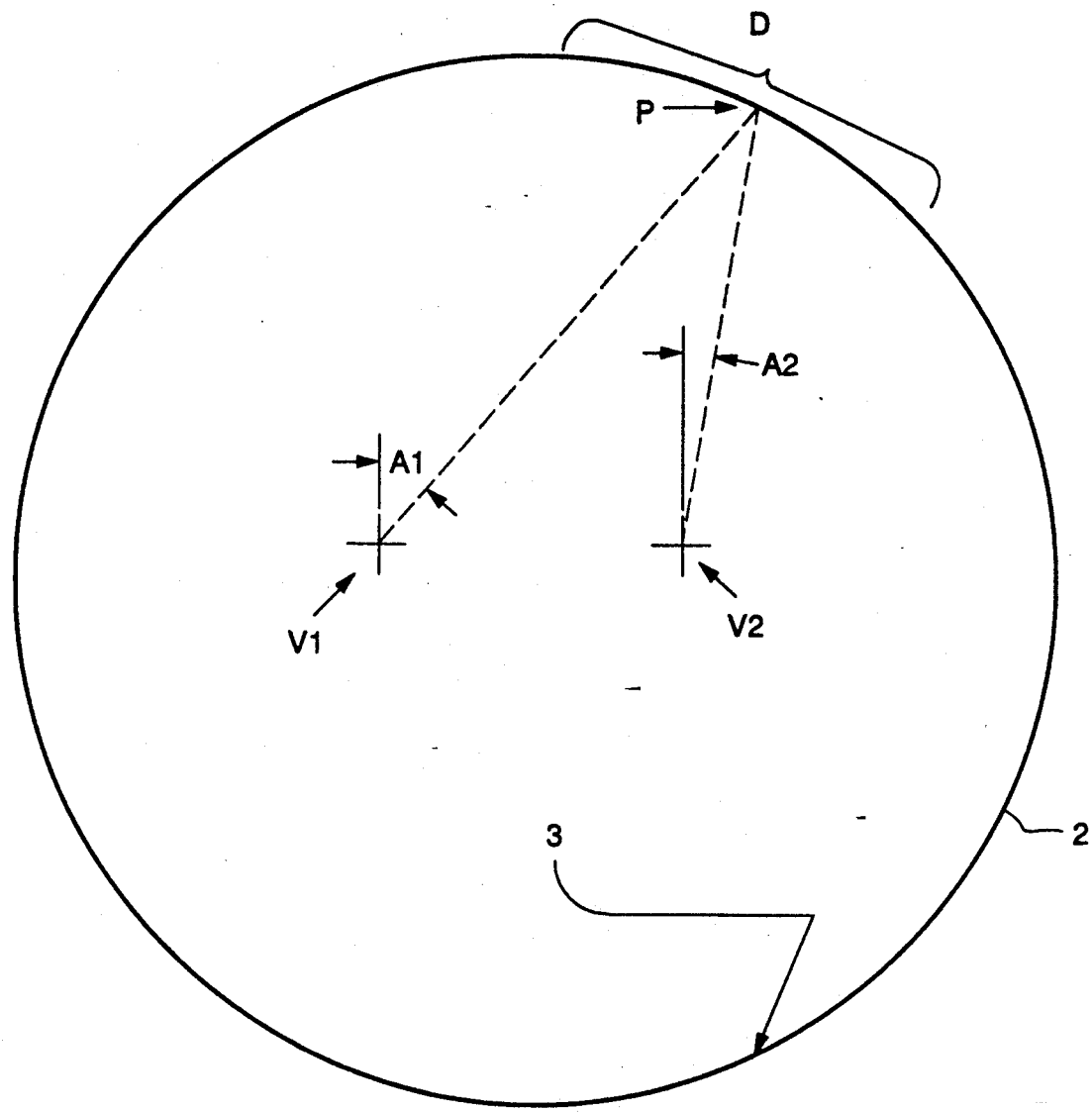
FIG. 1 illustrates the manner in which viewing distortion arises in a conventional catadioptric simulator adapted for use by two or more viewers.

FIG. 1 illustrates the manner in which viewing distortion arises in a conventional catadioptric simulator 1 adapted for use by two or more viewers. As shown in the simplified top view of FIG. 1, the simulator 1 is enclosed within a dome 2 disposed to provide a reflective viewing screen 3 on an interior surface thereof. The radius of curvature of the dome 2 is generally between twelve and twenty feet. A projection apparatus (not shown) is operative to project a visual display D upon any portion of the screen 3. First and second viewers V1 and V2 are located within the dome 2 at angles of sight A1 and A2, respectively, relative to a point P within the visual display D.

As mentioned in the Background of the Invention, the focal point of the image generated by the visual display D exists at only one location within the dome 2. If, for example, viewer V1 is positioned at such a focal point the image seen by viewer V2 will be distorted. Moreover, the image distortion experienced by viewer V2 will vary as angle A2 changes in response to movement of the display D over the screen 3. This phenomenon seriously limits the utility of conventional catadioptric simulators in training crews of two or more viewers.

The viewing system of the present invention is disposed to simultaneously provide first and second non-interfering color visual displays to a pair of viewers located within a single catadioptric projection system. To prevent each viewer from seeing the image intended for the other, each viewer preferably wears a visor which includes a filter for rejecting light originating within the display desired to be shown only to the other viewer. In particular, the first display is generated using light of first red, green and blue wavelengths and the second display is generated using light of second red, green and blue wavelengths. A first triple notch filter included in the visor worn by the first viewer rejects radiant energy of the second red, green and blue wavelengths. Similarly, a second triple notch filter included in the visor worn by the second viewer rejects light of the first red, green and blue wavelengths. In this manner, the spectrally multiplexed first and second displays may spatially overlap on the dome screen without interfering with the image seen by either viewer.

The inventive viewing system may be employed in, for example, catadioptric projection systems modified as described hereinafter to provide the aforementioned first and second color visual displays. In a particular type of display projection system, usually characterized as a catadioptric area-of-interest display (CAOID) projection system, sensors determine the line of sight of a helmet visor or the like worn by a viewer. The sensors generate one or more signals indicative of the viewer's line of sight, and supply the signal(s) to means in the projection system for steering a display to the desired location on the dome screen. A complete description of such a CAOID system appears in U.S. Pat. No. 5,004,331, issued Apr. 4, 1991 to Haseltine et al entitled "Catadioptric Projector, Catadioptric Projection System and Process", the teachings of which are incorporated herein by reference.

Figure 2:
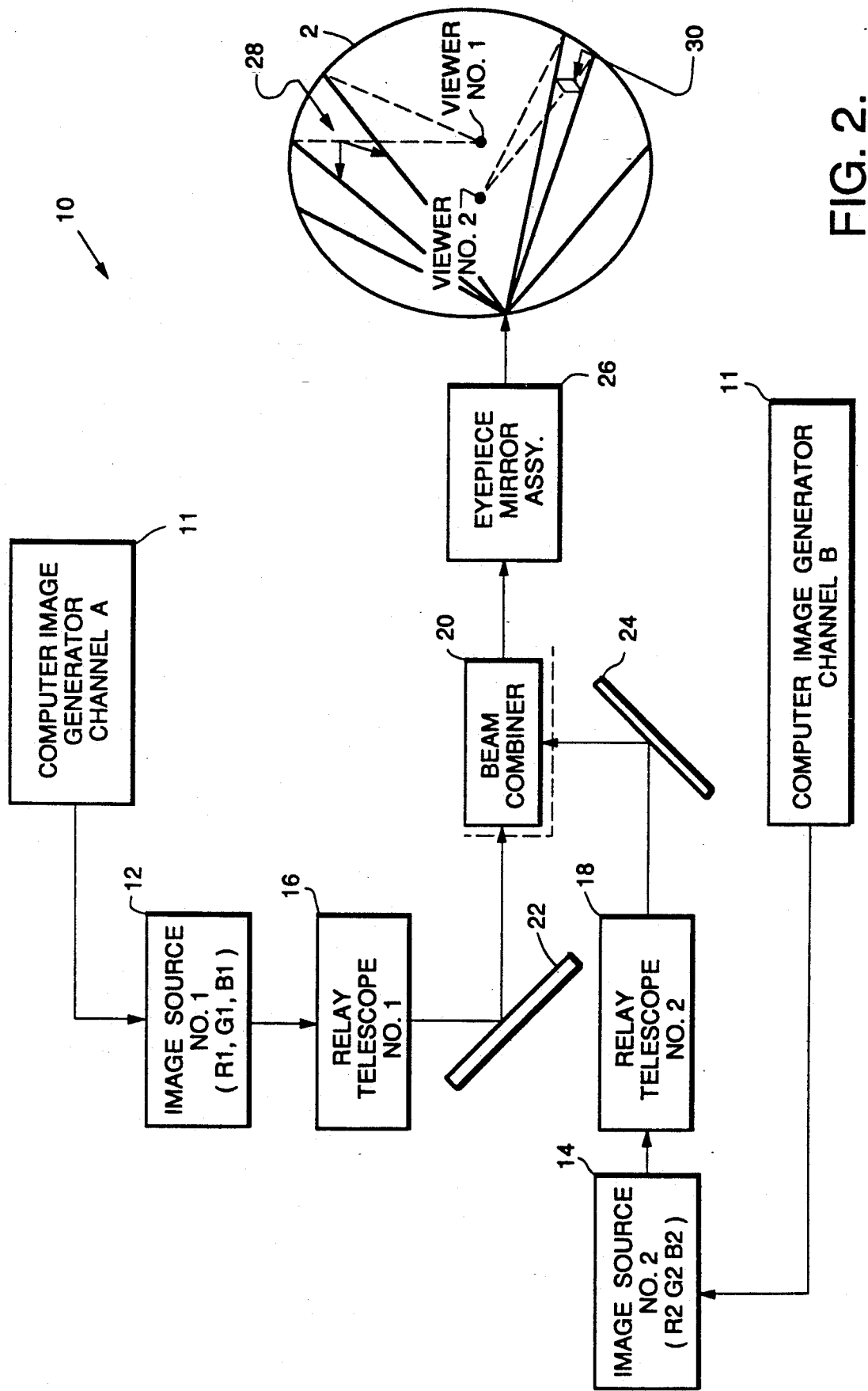
FIG. 2 shows a block diagram of a projection system incorporating the teachings of the present invention.

FIG. 2 is a block diagram of a projection system 10 incorporating the teachings of the present invention. In general, the invention includes first and second image sources 12 and 14 fed by first and second channels of image data from an computer image generator 11. The output of the first and second image sources 12 and 14 are input to associated relay telescopes 16 and 18, respectively. The outputs of the telescopes 16 and 18 are directed to a beam combiner 20 by a first and second motor driven mirrors 22 and 24 respectively. A combined image is projected into the simulator dome 2 and provides first and second displays therein.

In accordance with the present teachings, the computer image generator 11 is adapted to adjust the output of the first image source 12 and the image source 14 in order to create a first color display 28 and second color display 30 on a CAOID dome screen 2. The first and second color displays are projected on the dome screen such that the first viewer is located at the focal point of the reflected image created by the first display and the second viewer is positioned at the focal point of the reflected image created by the second display. In this manner, the first and second viewers are each able to see relatively distortion-free images.

The image sources are of conventional design. In a preferred embodiment of the present invention, the first image source 12 includes first, second and third laser sources for providing laser light at first red, green and blue wavelengths. Similarly, the second image source includes fourth, fifth and sixth laser sources for providing laser light at second red, green and blue wavelengths. The first image source 12 is driven by the computer image generator 11 so that the first color display 28 is comprised of laser energy at the first set of red, green and blue wavelengths (R1, G1, B1). Similarly, the second image generator 14 is driven by the computer image generator 11 so that the second color display 30 is comprised of laser energy at the second set of red, green and blue wavelengths (R2, G2, B2). The following is a listing of laser sources suitable for inclusion in first image source 12 and the second image source 14:

| Wavelength (nm) | Laser Source |
|---|---|
| FIRST IMAGE SOURCE | |
| First Blue (476.5) | Argon |
| First Green (514.5) | Argon |
| First Red (610.0) | Rhodamine 6G dye |
| SECOND IMAGE SOURCE | |
| Second Blue (488.0) | Argon |
| Second Green (530.9) | Krypton |
| Second Red (647.0) | Krypton |

Laser energy at the first red wavelength will typically be provided by an organic dye (as specified above) which is "pumped" by an argon laser. That is, the organic dye is illuminated with light from an argon laser which induces the dye to lase at the desired red wavelength. Of course, lasers of other wavelengths may be used in lieu of those specified above so long as a viewer would regard the light created as being suitably "blue", "green", or "red". In general, any image source is acceptable provided that the wavelength bandwidth for each of the six wavelengths is less than approximately 2 nanometers for a six wavelength embodiment.

A first triple notch filter provided in a visor worn by the first viewer, is adapted to reject radiant energy of the second red, green and blue wavelengths. A second triple notch filter provided in a visor worn by the second viewer is designed to reject light of the first red, green and blue wavelengths. Thus, the first and second triple notch filters are disposed to reject the laser energy produced by the first and second image sources 12 and 14, respectively.

Figure 3:
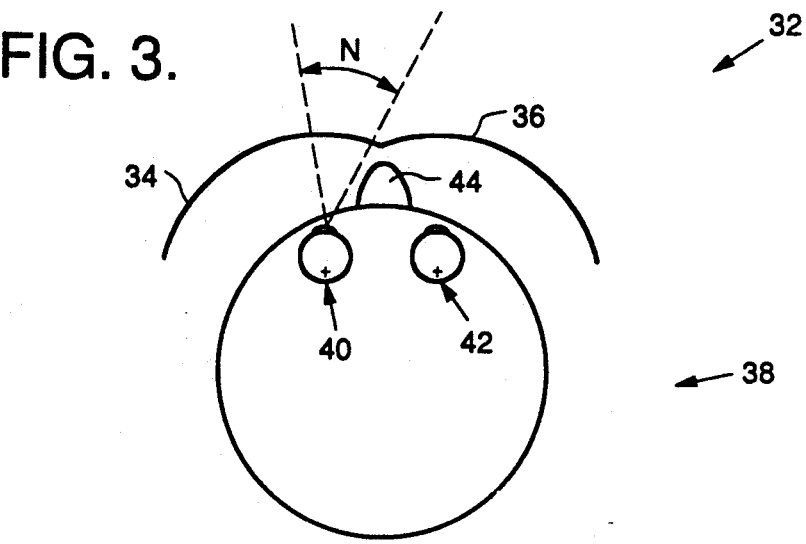
FIG. 3 shows a simplified top view of a triple notch filter visor used to physically support a thin film triple notch filter included within a preferred embodiment of the viewing system of the present invention.

FIG. 3 shows a simplified top view of a visor 32 on which the first or the second triple notch filter is disposed. The visor 32 is made of an optically transparent material, such as glass, which provides a substrate for a thin film filter as described below. The left and right lenses 34 and 36 of the visor 32 are positioned within the line of sight of a viewer 38. The left lens 34 is semi-spherical and has a radius of curvature centered on the left eye 40 of the viewer 38. Similarly, the right lens 36 is also semi-spherical and has a radius of curvature centered upon the right eye 42 of the viewer 38. Thus, the angle of sight from either the left or right eye 40 or 42 is constrained to remain approximately normal to the surface of a lens of the visor 32 and the filter thereon. Thus, the triple notch filters disposed on the lens need be designed to exhibit the desired optical density for relatively small angles of incidence only (e.g. zero to five degrees). In addition, the radius of curvature of the visor 32 should be long enough such that the visor 32 does not contact the nose 44 of the viewer 38. Moreover, the lenses 34 and 36 should extend as close as is possible to the nose 44 such that the left eye 40 does not have a line of sight through the right lens 36 and vice versa. Otherwise, the portion of the field-of-view of the left eye 40 extending through the right lens 36 would potentially encompass image light having an angle of incidence in excess of the specified five degrees. Accordingly, the lenses 34 and 36 will preferably have a radius of curvature of four to six inches in order to yield a nasal angle of sight N of approximately twenty degrees. Visor lenses of shorter radii of curvature (goggle-type) may afford larger nasal angles of sight but will generally result in lines of sight through the visor 32 in excess of five degrees. The visor 32 is preferably secured to a helmet (not shown) worn by the viewer 38.

Figure 4A:
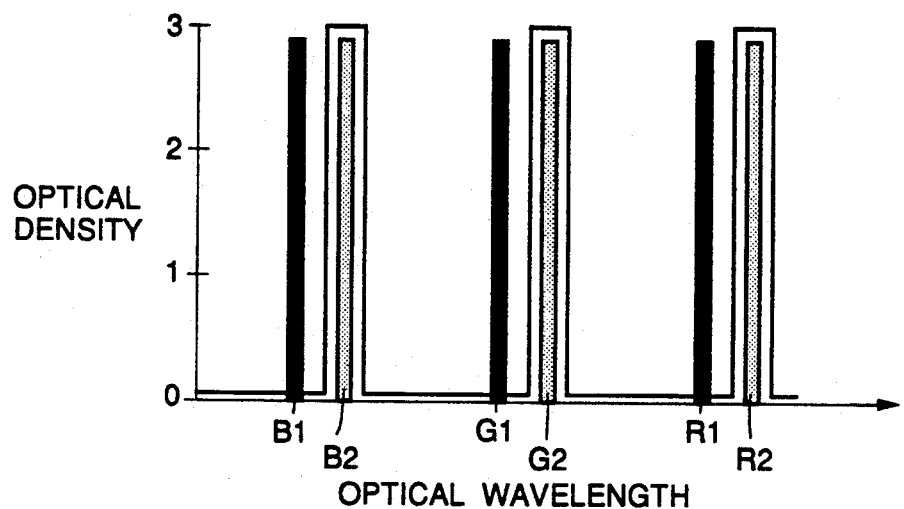
FIG. 4a shows a preferred profile of optical density as a function of wavelength for a first optical triple notch filter included within the inventive non-interfering viewing system.

In the preferred embodiment the first and second triple notch filters will be realized as optical thin films. In particular, optical reflection holograms or dielectric thin films may be fabricated to yield an optical density profile such as that depicted in FIG. 4a. FIG. 4a shows a preferred profile of optical density as a function of wavelength for the first triple notch filter. Optical density D is defined in terms of the optical transmittance T as:

$$D = \log(1/T). \quad [1]$$

As shown in FIG. 4a, the first triple notch filter is preferably characterized by an optical density of approximately three at the wavelengths R2, G2 and B2. The preferred profile for the second triple notch filter is substantially identical to that shown in FIG. 4a, with the exception that high optical density is exhibited at the wavelengths R1, G1, and B1. Since substantially all wavelengths except R2, G2 and B2 are transmitted by the first triple notch filter, the first viewer is able to see both the surrounding environment (e.g. a simulated cockpit interior) and the first display without experiencing interference from the second display.

The design of suitable optical thin films for the triple notch filters is facilitated by currently available computer programs. These programs are typically based on Kogelnik coupled wave theory which may be used to obtain approximations of the optical density profiles of particular thin films. For example, the Angle 1D computer program written by James A. Arns is operative to generate an approximation of the optical density profile of an optical thin film filter given specific film parameters (i.e. thickness and index of modulation). It is noted that both reflection holograms and dielectric thin films may be physically realized on the basis of these parameters. The entries in Tables I, II, III and IV below correspond to computer estimates of the optical densities exhibited by implementations of the first and second triple notch filters having specified emulsion thicknesses and indices of modulation. Optical densities were computed for both the first and second triple notch filters at wavelengths R1, G1, B1, R2, G2, and B2, (610.0, 514.5, 476.5, 647.0, 530.9 and 488.0 nm). The estimated optical densities are specified for angles of incidence of zero degrees, zero to five degrees, and five to ten degrees.

TABLE I

OPTICAL DENSITY AT REJECTED AND ACCEPTED WAVELENGTHS

Emulsion Thickness = 30 microns
Index Modulation = .021

| Angle of Incidence (degrees) | Rejected Wavelengths | | | Accepted Wavelengths | | |
|---|---|---|---|---|---|---|
| First Triple Notch Filter | | | | | | |
| | B2 | G2 | R2 | B1 | G1 | R1 |
| 0 | 3.0 | 2.7 | 2.0 | .008 | .015 | .000 |
| 0–5 | 3.0 | 2.5 | 2.0 | .021 | .015 | .006 |
| 5–10 | 1.4 | 1.3 | 1.2 | .060 | .033 | .007 |
| Second Triple Notch Filter | | | | | | |
| | B1 | G1 | R1 | B2 | G2 | R2 |
| 0 | 3.0 | 2.7 | 2.2 | .000 | .000 | .000 |
| 0–5 | 2.7 | 2.5 | 2.1 | .008 | .001 | .001 |
| 5–10 | 0.7 | 0.8 | 1.2 | .011 | .001 | .005 |

TABLE II

OPTICAL DENSITY AT REJECTED AND ACCEPTED WAVELENGTHS

Emulsion Thickness = 30 microns
Index Modulation = .030

| Angle of Incidence (degrees) | Rejected Wavelengths | | | Accepted Wavelengths | | |
|---|---|---|---|---|---|---|
| First Triple Notch Filter | | | | | | |
| | B2 | G2 | R2 | B1 | G1 | R1 |
| 0 | 3+ | 3+ | 3.0 | .010 | .004 | .003 |
| 0–5 | 3+ | 3+ | 3.0 | .113 | .029 | .014 |
| 5–10 | 3+ | 3.0 | 2.5 | .206 | .065 | .015 |
| Second Triple Notch Filter | | | | | | |
| | B1 | G1 | R1 | B2 | G2 | R2 |
| 0 | 3+ | 3+ | 3+ | .003 | .002 | .002 |
| 0–5 | 3+ | 3+ | 3+ | .018 | .003 | .002 |
| 5–10 | 3.0 | 3.0 | 2.7 | .022 | .003 | .010 |

TABLE III

OPTICAL DENSITY AT REJECTED AND ACCEPTED WAVELENGTHS

Emulsion Thickness = 100 microns
Index Modulation = .007

| Angle of Incidence (degrees) | Rejected Wavelengths | | | Accepted Wavelengths | | |
|---|---|---|---|---|---|---|
| | First Triple Notch Filter | | | | | |
| | B2 | G2 | R2 | B1 | G1 | R1 |
| 0 | 3+ | 3.0 | 2.4 | .004 | .000 | .000 |
| 0-5 | 2.4 | 2.0 | 1.8 | .005 | .003 | .001 |
| 5-10 | 0.0 | 0.0 | 0.0 | .009 | .004 | .001 |
| | Second Triple Notch Filter | | | | | |
| | B1 | G1 | R1 | B2 | G2 | R2 |
| 0 | 3.0 | 3.0 | 2.5 | .001 | .000 | .000 |
| 0-5 | 0.1 | 0.5 | 1.9 | .001 | .000 | .000 |
| 5-10 | 0.0 | 0.0 | 0.0 | .001 | .000 | .000 |

TABLE IV

OPTICAL DENSITY AT REJECTED AND ACCEPTED WAVELENGTHS

Emulsion Thickness = 100 microns
Index Modulation = .010

| Angle of Incidence (degrees) | Rejected Wavelengths | | | Accepted Wavelengths | | |
|---|---|---|---|---|---|---|
| | First Triple Notch Filter | | | | | |
| | B2 | G2 | R2 | B1 | G1 | R1 |
| 0 | 3+ | 3+ | 3+ | .008 | .000 | .000 |
| 0-5 | 3+ | 3+ | 3.0 | .011 | .006 | .001 |
| 5-10 | 0.0 | 0.0 | 0.0 | .017 | .008 | .002 |
| | Second Triple Notch Filter | | | | | |
| | B1 | G1 | R1 | B2 | G2 | R2 |
| 0 | 3+ | 3+ | 3+ | .002 | .000 | .001 |
| 0-5 | 3 | 3 | 3.0+ | .002 | .001 | .001 |
| 5-10 | 0.0 | 0.0 | 0.0 | .002 | .001 | .001 |

The computer simulation results in Tables I through IV were obtained by specifying that the optical density at each rejected wavelength for angles of incidence from zero to five degrees be in excess of 2.0 (i.e. greater than 100:1 attenuation). It was further specified that the optical density at each of the accepted wavelengths be less than 0.1 (i.e. greater than 80% transmittance).

As shown in Table I, for an emulsion thickness of 30 microns and an index of modulation of 0.21 the aforementioned specifications are met. However, it is noted that the first triple notch filter exhibits an optical density of only precisely 2.0 at wavelength R2 (647 nm).

As shown in Table II, increasing the index of modulation to 0.030 increases the optical density at the rejected wavelengths. However, the optical density at wavelengths surrounding the rejected wavelengths is also commensurately increased. For example, as shown in Table II the first triple notch filter exhibits an optical density of 0.113 (77% transmission) at the accepted wavelength B1 (476.5 nm) for an angle of incidence of five degrees. Accordingly, the realization of the first triple notch filter having an emulsion thickness of thirty microns and index modulation of 0.030 does not meet the specification of 80% transmission at all accepted wavelengths.

Referring to Table III, increasing the emulsion thickness to one-hundred microns appreciably narrows the spectral band surrounding each rejected wavelength over which each triple notch filter exhibits high optical density. One benefit accruing from this phenomenon is that optical density at the accepted wavelengths is substantially reduced (improved). However, an optical density of 2.0 is not attained at all rejected wavelengths for angles of incidence from zero to five degrees.

As is indicated by Table IV, the aforementioned specifications are met for an emulsion thickness of 100 microns and an index modulation of 0.010. Optical films of the thicknesses and indices of modulation specified herein may be conventionally fabricated as multilayer dielectric films by, for example, Optical Coating Laboratories (Santa Rosa, Calif.), or by Omega Optical (Brattleboro, Vt.). Alternatively, the first and second triple notch filters may each be physically realized as a reflection hologram using a material such as a dichromated gelatin or a photopolymer. Thin films of photopolymers exhibiting suitable optical density may be synthesized by the DuPont Corp., or by the Polaroid Corp., using proprietary techniques.

Figure 4B:
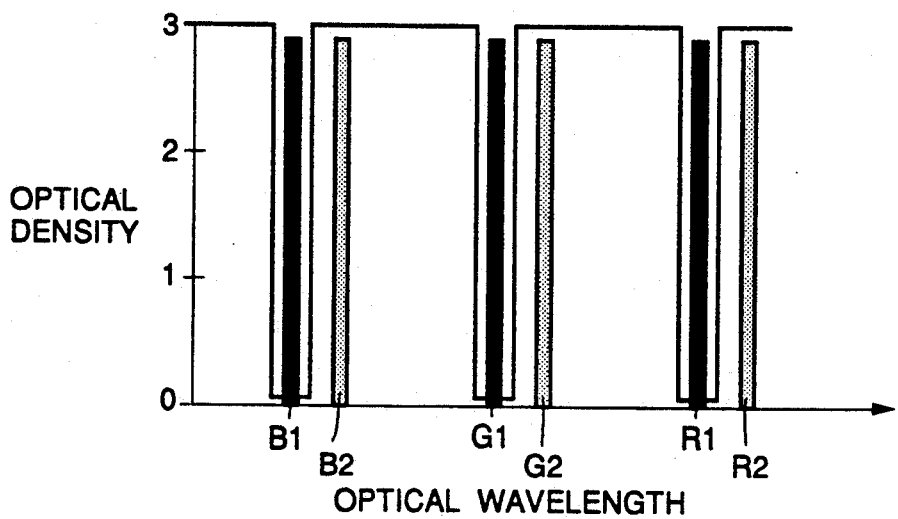
FIG. 4b shows an alternative profile of optical density as a function of wavelength for a minimum see-through first optical triple notch filter included within the inventive non-interfering viewing system.

In an alternative "minimum see-through" embodiment of the present invention the first triple notch filter may be characterized by the modified optical density profile of FIG. 4b. Again, as in FIG. 4a, the modified first triple notch filter is preferably characterized by an optical density of approximately three at the wavelengths R2, G2 and B2. However, the optical density for the modified filter is designed to be approximately three at all wavelengths except R1, G1, and B1. In this manner the first viewer is precluded from seeing anything within, for example, a simulated cockpit except for the first displayed image.

The modified profile for the second triple notch filter is substantially similar to that shown for the first modified filter in FIG. 4b, with the exception that high optical density is exhibited at substantially all wavelengths except R2, G2, and B2. Similarly, since all wavelengths except R2, G2 and B2 are designed to be rejected by the second triple notch filter, the second viewer sees only the second display and is prevented from observing either the first display or extraneous light at intervening wavelengths within the viewing environment.

In certain applications it may be desired that the triple notch filters exhibit a larger optical density than that specified above at the rejected wavelengths. This increased optical density may be effected by oppositely polarizing the optical energy intended for each viewer. For example, if wavelengths R1, G1 and B1 were circularly polarized in a right-handed orientation then wavelengths R2, G2 and B2 would be circularly polarized in a left-handed orientation. In this instance the first triple notch filter would be modified to include a polarizing thin film layer for transmitting radiant energy circularly polarized in a right-handed manner, and for rejecting energy of left-handed polarization. The second triple notch filter would be modified to include a thin film polarization layer having the opposite transmission characteristics. The desired polarization would be generated in the incident image radiation by placing polarizers of opposite orientation in the paths of the laser light emanating from the first and second image sources 12 and 14.

While the present invention has been described herein with reference to a particular embodiment, it is understood that the invention is not limited thereto. The teachings of this invention may be utilized by one having ordinary skill in the art to make modifications within the scope thereof. For example, the first and second visual displays need not track the line of sight of the first and second viewers. That is, the present invention is disposed to provide non-interfering viewing in the situation wherein the first and second visual displays each illuminate substantially the entire dome screen.

Moreover, the present invention may be employed to provide stereo color imagery to one or move viewers. In particular, a first visual display generated using radiant energy of wavelengths R1, G1, and B1 would be generated for the left eye of the viewer, while a second visual display of wavelengths R2, G2 and B2 would be provided for the right eye. The visor lens covering the left eye would include a first triple notch filter (i.e. for rejecting R2, B2 and G2), and a second triple notch filter would be deposited on the lens in the line of sight of the right eye. Both visual displays would be projected so as to have a focal point coincident with the location of the viewer. If the wavelengths R1, G1, B1, R2, G2, and B2 are selected as specified herein the slight color difference between, for example, R1 and R2 should not be objectionable to a viewer.

It is therefore contemplated by the appended claims to cover any and all such modifications.

Accordingly,

What is claimed is:

1. A non-interfering viewing system for use within a catadioptric display projection system, said viewing system comprising:
   projector means for generating a first image which includes radiant energy of first plurality of pure optical wavelengths and for generating a second image which includes radiant energy of a second plurality of pure optical wavelengths within the same spectral range as said first plurality;
   first filter means, positioned in the field-of-view of a first viewer, for transmitting said radiant energy of said first plurality f pure optical wavelengths to said first viewer and for rejecting said radiant energy of said second plurality of pure optical wavelengths; and
   a second filter means, positioned in a field-of-view of a second viewer, for transmitting said radiant energy of said second plurality of pure optical wavelengths to said second viewer and for rejecting said first plurality pure optical wavelengths.

2. A non-interfering viewing system for use within a catadioptric display projection system, said viewing system comprising:
   projector means for generating a first image which includes radiant energy of first red, green, and blue optical wavelengths and for generating a second image which includes radiant energy of second red, green, and blue optical wavelengths;
   first triple notch filter means, positioned in the field-of-view of a first viewer, for transmitting said radiant energy of said first red, green and blue wavelengths to said first viewer and for rejecting said radiant energy of said second red, green and blue optical wavelengths; and
   second triple notch filter means, positioned in a field-of-view of a second viewer, for transmitting said radiant energy of said second red, green and blue optical wavelengths to said second viewer and for rejecting said first red, green and blue optical wavelengths.

3. The viewing system of claim 2 wherein said first and second notch filter means include first and second triple notch filters with first and second optical thin films, respectively.

4. The viewing system of claim 3 further including first and second visor means for mechanically supporting said first and second notch filter means, respectively.

5. The viewing system of claim 4 wherein the difference between said first and second blue wavelengths is less than twelve nanometers, the difference between said first and second green wavelengths is less than seventeen nanometers and the difference between said first and second red wavelengths is less than thirty eight nanometers.

6. The viewing system of claim 5 wherein said first optical film may be characterized as being of a low optical density at substantially all wavelengths except at said second red, green and blue wavelengths, and wherein said second optical film may be characterized as being of a low optical density at substantially all wavelengths except at said first red, green and blue wavelengths.

7. The viewing system of claim 4 further including:
   first means for determining a first line of sight for said first visor means and for delivering a signal indicative of said first line of sight to said projector means and
   second means for determining a second line of sight for said second visor means and for delivering a signal indicative of said second line of sight to said projector means wherein said projector means further includes means for steering said first image into the field-of-view of said first visor means and said second image into the field-of-view of said second visor means.

8. The viewing system of claim 2 wherein said first and second notch filter means include first and second triple notch filters with first and second optical holographic elements, respectively.

9. In a display system disposed to provide first and second images within a field-of-view shared by two or more viewers, a method for allowing said first viewer to view said first image without perceiving said second image and for allowing said second viewer to view said second image without perceiving said first image, comprising the steps of:
   a) generating said first image using radiant energy of first and second pure optical wavelengths and generating said second image using radiant energy of third and fourth pure optical wavelengths within the same spectral range as said first and second pure optical wavelengths; and
   b) filtering said radiant energy from said images to substantially prevent radiant energy of said first and second pure optical wavelengths from impinging upon the eyes of said second viewer and to substantially prevent radiant energy of said third and fourth pure optical wavelengths from impinging upon the eyes of said first viewer.

10. The method of claim 9 wherein said step of filtering includes the step of placing a first optical notch filter in the line of sight of said first viewer, said first notch filter being characterized by a high optical density at said third and fourth wavelengths.

11. The method of claim 10 wherein said step of filtering includes the step of placing a second optical notch filter in the line of sight of said second viewer, said second optical notch filter being characterized by a high optical density at said first and second wavelengths.

12. The method of claim 11 wherein said first optical filter may be characterized as being of a low optical density at substantially all wavelengths except at said third and fourth wavelengths, and wherein said second optical filter may be characterized as being of a low optical density at substantially all wavelengths except at said first and second wavelengths.

13. In a display system disposed to provide first and second color images within a field-of-view shared by two or more viewers, a method for allowing said first viewer to view said first color image without perceiving said second color image and for allowing said second viewer to view said second color image without perceiving said first color image, comprising the steps of:
  a) generating said first color image using radiant energy of first red, first green and first blue wavelengths and generating said second image using radiant energy of second red, second green and second blue wavelengths and
  b) filtering said images to substantially prevent said radiant energy of said first red, green and blue wavelengths from impinging upon the eyes of said second viewer and to substantially prevent radiant energy of said second red, green and blue wavelengths from impinging upon the eyes of said first viewer.

14. The method of claim 13 wherein said step of filtering includes the step of placing a first optical triple notch filter in the field-of-view of said first viewer, said first notch filter being characterized by a high optical density at said second red, green and blue wavelengths.

15. The method of claim 14 wherein said step of filtering includes the step of placing a second optical triple notch filter in the field-of-view of said second viewer, said second optical notch filter being characterized by a high optical density at said first red, green and blue wavelengths.

16. The method of claim 15 wherein said first optical filter may be characterized as being of a low optical density at substantially all wavelengths except at said second red, green and blue wavelengths, and wherein said second optical filter may be characterized as being of a low optical density at substantially all wavelengths except at said first red, green and blue wavelengths.

17. The method of claim 13 wherein said step of generating includes the step of polarizing said first and second color images into first and second polarization states and wherein said step of filtering includes the step of substantially preventing radiation of said first polarization state from reaching said second viewer and substantially preventing radiation of said second polarization state from reaching said first viewer.

* * * * *